United States Patent [19]

Sutherland et al.

[11] Patent Number: 5,666,406

[45] Date of Patent: Sep. 9, 1997

[54] HAZARD PREVENTION FOR TELEPHONE LINE INTERFACE CIRCUITS

[75] Inventors: Brian A. F. S. Sutherland, Kanata; Stanley Daniel Rosenbaum, Nepean; Paul Fong-Yan Hung, Stittsville, all of Canada

[73] Assignee: Northern Telecom Limited, Montreal, Canada

[21] Appl. No.: 200,081

[22] Filed: Feb. 10, 1994

Related U.S. Application Data

[63] Continuation-in-part of Ser. No. 868,893, Apr. 16, 1992, and Ser. No. 862,478, Apr. 2, 1992, Pat. No. 5,323,461, which is a continuation-in-part of Ser. No. 648,776, Jan. 31, 1991, Pat. No. 5,103,387.

[51] Int. Cl.$^6$ .......................... H04M 1/00; H04M 3/00
[52] U.S. Cl. .......................... 379/399; 379/413; 379/418; 379/252
[58] Field of Search .......................... 379/251, 252, 379/253, 399, 418, 413

[56] References Cited

U.S. PATENT DOCUMENTS

| | | | |
|---|---|---|---|
| 4,922,526 | 5/1990 | Morganstein et al. | 379/374 |
| 5,027,391 | 6/1991 | O'Neill et al. | 379/373 |
| 5,260,996 | 11/1993 | Dillon et al. | 379/418 |

Primary Examiner—Jack K. Chiang
Attorney, Agent, or Firm—R. John Haley

[57] ABSTRACT

A telephone line interface circuit comprises a controlled voltage generator for selectively generating a ringing voltage waveform for a telephone line or a supply voltage for a drive circuit for the telephone line, and a switching circuit interconnecting an output of the controlled voltage generator, the drive circuit, and the telephone line accordingly. In order to avoid creating a potentially hazardous condition on the telephone line, an interlock is provided between enabling of the controlled voltage generator and switching of the switching circuit, and software and hardware monitoring functions monitor operation of the control software and the controlled voltage generator and disable the controlled voltage generator in response to fault conditions or unusual behavior.

8 Claims, 3 Drawing Sheets

HAZARD PREVENTION FOR TELEPHONE LINE INTERFACE CIRCUITS

This is a continuation-in-part of co-pending U.S. patent application Ser. No. 07/868,893 filed Apr. 16, 1992 in the names of R. W. Rosch et al. and entitled "Telephone Line Interface Circuit With Voltage Control" and continuation-in-part of U.S. patent application Ser. No. 07/862,478 filed Apr. 2, 1992 U.S. Pat. No. 5,323,461, in the names of S. D. Rosenbaum et al. and entitled "Telephone Line Interface Circuit With Voltage Switching", which is a continuation-in-part of U.S. patent application Ser. No. 07/648,776 filed Jan. 31, 1991 in the names of S. D. Rosenbaum et al. and entitled "High Voltage Converter", resulting in U.S. Pat. No. 5,103,387 issued Apr. 7, 1992. The entire disclosure of each of the parent applications is hereby incorporated herein by reference.

CROSS-REFERENCE TO RELATED APPLICATIONS

Reference is also directed to the following related United States patent applications, the entire disclosure of each of which is hereby incorporated herein by reference, which describe various aspects of a versatile programmable telephone line interface circuit:

Ser. No. 07/868,941 filed Apr. 16, 1992 in the names of R. W. Rosch et al. and entitled "Wideband Telephone Line Interface Circuit" (U.S. Pat. No. 5,274,702 issued Dec. 21, 1993);

Ser. No. 08/010,244 filed Jan. 28, 1993 in the names of S. A. Gores et al. and entitled "Method Of Providing D.C. Feed To A Telephone Line"; and Ser. No. 08/041,377 filed Apr. 1, 1993 in the names of P. F. Y. Hung et al. and entitled "Protection And Recovery Of Telephone Line Interface Circuits".

BACKGROUND OF THE INVENTION

This invention relates to telephone line interface circuits, and is particularly concerned with a method of operating a telephone line interface circuit to avoid creating potentially hazardous conditions on a telephone line to which the line interface circuit is connected in use.

Various methods of applying high voltage signalling to a telephone subscriber line are well known. The most common example of high voltage signalling is the telephone ringing signal, and accordingly this is referred to predominantly below, but other forms of high voltage signalling, for example coin signalling and message indicating, are also well known.

A ringing signal generator originally typically consisted of rotating machinery provided commonly for many telephone lines, the machinery including a commutator for distributing bursts of a ringing signal to various lines. Similar generator arrangements existed for generating other high voltage signals. Such generators were considered acceptably safe in that they could not create hazardous voltage and current conditions on a telephone line; if the commutation ceased due to a failure of the machinery to rotate, the generation of voltage and current also ceased. Thus for example such a generator could not generate a high d.c. voltage.

More recent telephone systems have generally continued the practice of generating high voltage signalling in a common part of the system. Using a common generator, it has been feasible to provide relatively elaborate measures to avoid the possibility of creating hazardous voltage and current conditions on the telephone lines. Such hazard prevention measures may be implemented using dedicated hardware circuitry, with duplicated or redundant systems for increased reliability.

The parent and cross-referenced applications above relate to a programmable telephone line interface circuit which includes an individual software-controlled voltage generator, of the form described in U.S. Pat. No. 5,103,387, which is necessarily designed to be capable of generating relatively high voltages and currents. While these voltages and currents are considered to be safe within certain normal operating conditions typically imposed by telephone system administrations, faults can arise which could cause the controlled voltage generator to operate beyond these conditions, with the possibility of creating potentially hazardous voltage and current conditions on the telephone line.

For example, in order to produce a ringing voltage waveform, the software in the line interface circuit supplies a low voltage reference waveform to the controlled voltage generator, whose output is a corresponding waveform at high voltage which is supplied to the telephone line via relay contacts or switches. A software fault could cause samples of the reference waveform not to be updated in their normal sequence, possibly creating a high d.c. voltage produced by the controlled voltage generator and supplied to the telephone line. Conversely, a hardware fault such as a stuck relay contact could cause an undesired high voltage to be produced by the controlled voltage generator and supplied to the telephone line. In either case, a potentially hazardous, and therefore impermissible, voltage would be applied to the telephone line.

Various other possible fault situations, some of which are discussed further below, can be envisaged in which there is a potential for a hazardous voltage or current condition to be produced on the telephone line. This potential is not diminished by the nature of the line interface circuit, specifically that it must be produced in large numbers at low costs and must provide consistently reliable service over a period of many years. To facilitate such service it is also desirable to avoid faults giving rise to voltage or current conditions which may be potentially damaging to the line interface circuit itself.

The relatively elaborate measures to avoid hazardous conditions, known for high voltage generators which are common to many telephone lines, are impractical and not economically feasible for high voltage generators provided on individual line interface circuits. For example, the costs and space requirements of dedicated hardware circuitry and duplicated systems would be prohibitive for individual line interface circuits.

An object of this invention, therefore, is to provide a method of operating a telephone line interface circuit, including a generator for high voltage signalling, in which the potential for creating a hazardous condition on the telephone line in the event of a fault is substantially reduced or eliminated.

SUMMARY OF THE INVENTION

This invention provides a method of operating a telephone line interface circuit which includes a controlled voltage generator, a drive circuit, and a switching circuit, the line interface circuit having a first operating state in which the controlled voltage generator generates a relatively low voltage which is coupled by the switching circuit to the drive circuit, and a second operating state in which the controlled voltage generator generates a high voltage waveform which is coupled by the switching circuit from an output of the controlled voltage generator to a telephone line, the method comprising switching from the first operating state to the second operating state by the steps of sequentially: disabling the controlled voltage generator; changing the state of the switching circuit; and enabling the controlled voltage generator to generate the high voltage waveform.

This method conveniently further comprises switching from the second operating state to the first operating state by the steps of sequentially: disabling the controlled voltage generator; changing the state of the switching circuit; and enabling the controlled voltage generator to generate the relatively low voltage. Preferably the step of disabling the controlled voltage generator from generating the high voltage waveform comprises initially controlling the controlled voltage generator to generate a relatively low voltage at its output, as discussed further below.

The method preferably further comprises the steps of: detecting a potential failure to continue generation of the high voltage waveform by the controlled voltage generator in the second operating state; and disabling the controlled voltage generator in response to detection of such a potential failure. The step of detecting a potential failure to continue generation of the high voltage waveform by the controlled voltage generator in the second operating state preferably comprises the steps of monitoring a clock signal supplied to the controlled voltage generator and monitoring updating of a waveform reference voltage supplied to the controlled voltage generator.

BRIEF DESCRIPTION OF THE DRAWINGS

The invention will be further understood from the following description with reference to the accompanying drawings, in which.

DETAILED DESCRIPTION

Figure 1:
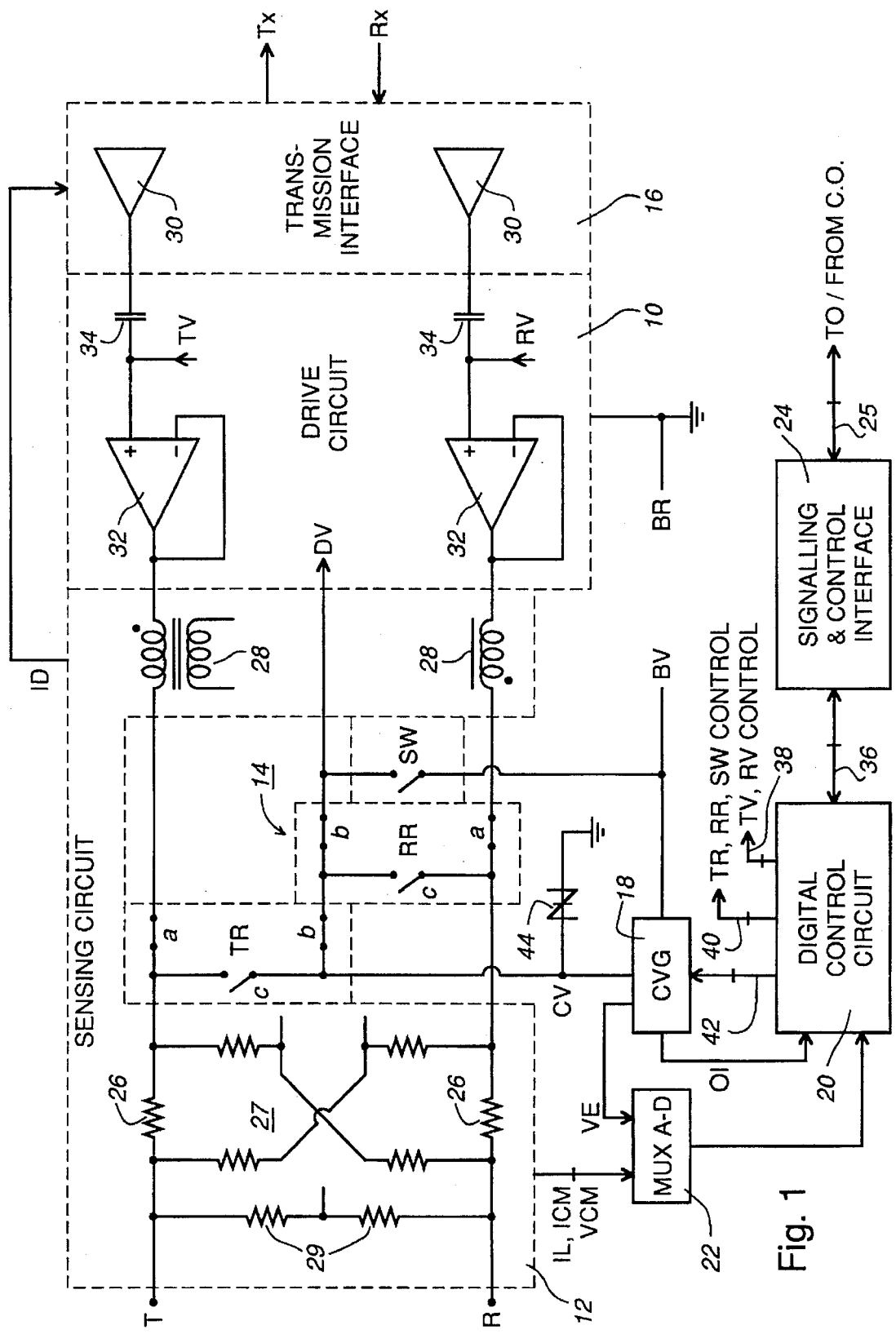
FIG. 1 is a schematic diagram illustrating parts of a telephone line interface circuit which is arranged to operate in accordance with this invention.

FIG. 1 illustrates parts of a telephone line interface circuit, which is assumed in the following description to form part of and be located at a telephone central office or C.O. (not shown), but which may alternatively form part of a remote terminal which is coupled to a C.O. via a multiplexed communications path. Only those parts of the line interface circuit which are relevant to a full understanding of this invention are shown in FIG. 1.

As shown within broken lines, the line interface circuit comprises a drive circuit 10 which is coupled to terminals T and R, for connection to the tip and ring wires of a two-wire telephone line, via a sensing circuit 12 and a switching circuit 14 comprising contacts of tip-wire and ring-wire relays TR and RR and an electronic switch SW. The drive circuit 10 is also coupled to a transmission interface 16 which communicates with the remainder of the C.O. via transmit and receive signal paths Tx and Rx respectively. The line interface circuit also includes a controlled voltage generator or CVG 18, a digital control circuit 20, a multiplexing analog-to-digital (A-D) converter 22, and a signalling and control interface circuit 24 which communicates signalling to and receives programming commands from the remainder of the C.O. via a bus 25. For simplicity and clarity, FIG. 1 shows multiple-line paths such as the bus 25 by a single line with a transverse bar.

The line interface circuit is operable, with appropriate programming software down-loaded from the C.O. to the interface circuit 24, to provide any of a wide range of communications services for any of a wide range of communications equipment (not shown) coupled to the telephone line. The drive circuit 10, sensing circuit 12, switching circuit 14, transmission interface 16, and digital control circuit 20 are conveniently of the form fully described in the parent and related applications already referred to, and the CVG 18 is as described in U.S. Pat. No. 5,103,387. Only those parts of the sensing circuit 12, drive circuit 10, and transmission interface 16 which are necessary for a full understanding of this invention are illustrated in FIG. 1 and are described below.

The sensing circuit 12 includes a balanced arrangement of feed resistors 26 connected via first contacts a (shown closed in FIG. 1) of the relays TR and RR in series with windings of an a.c. sensing transformer 28 to the outputs of the drive circuit 10, a current sensing resistor network 27, and a common mode voltage sensing network comprising two resistors 29 connected in series between the terminals T and R. In a manner which is fully described in application Ser. No. 07/868,941 referred to above, the sensing circuit produces from outputs of the components 27 to 29 output signals ID, IL, ICM, and VCM. The signal ID represents the differential a.c. or signal current on the telephone line and hence flowing via the terminals T and R, and is supplied to the transmission interface 16. The signal IL represents the loop current on the telephone line, and the signal ICM represents the longitudinal or common mode current on the telephone line, and the signal VCM represents a common mode voltage on the telephone line.

The transmission interface 16 produces a signal on the transmit path Tx from the differential current signal ID, and includes amplifiers 30 having low impedance outputs, constituting outputs of the transmission interface 16 coupled to the drive circuit 10, at which are produced complementary signals derived from a signal received via the receive path Rx.

The drive circuit 10 comprises two d.c. buffer amplifiers 32, associated with the tip and ring terminals T and R respectively, each of which has its output, constituting a respective output of the drive circuit 10, connected to its inverting input to provide the amplifier with a unity gain so that these amplifiers have a maximum bandwidth and a minimum output impedance. Each amplifier 32 has its non-inverting input connected via a capacitor 34 to a respective output of the transmission interface 16. The non-inverting inputs of the amplifiers 32 are also supplied with d.c. voltages, TV and RV for the tip and ring sides respectively of the drive circuit, which are controlled by the digital control circuit 20 and determine the voltages at the outputs of the amplifiers 32 and hence at the terminals T and R in a manner which is fully described in application Ser. No. 08/010,244 referred to above. The drive circuit 10 is supplied with power from supply rails which are at a battery return (BR) potential of ground (zero volts) and a voltage DV which is produced via the switching circuit 14 as described below.

The signals IL, ICM, and VCM produced by the sensing circuit 12, and an error voltage VE from the CVG 18, are supplied to inputs of the multiplexing A-D converter 22, whose digital outputs are supplied to the digital control circuit 20. The digital control circuit 20 monitors the digitized signals and operates in accordance with a stored program, communicating to this end with the interface circuit 24 via a bus 36, to control the values of the voltage TV and RV, the state of the switching circuit 14, and the operation of the CVG 18, via respective buses 38, 40, and 42. The digital control circuit 20 includes digital-analog converters (DACs, not shown) for producing the analog voltages TV and RV, and a DAC and driver circuitry for driving the CVG 18 with three control signals as described in U.S. Pat. No. 5,103,387. As also described in that patent, the CVG 18 has an over-current output OI which provides a further input to the digital control circuit 20, and produces the error voltage VE which represents a difference between its actual output voltage CV and a desired output voltage supplied via the bus 42.

By way of example, FIG. 1 illustrates the line interface circuit in a d.c. feed state for the telephone line. In this state the digital control circuit 20 opens the switch SW and controls the relays TR and RR so that their first and second contacts a and b are closed and third contacts c are open as shown (this is referred to as the reset state of the relays), and controls the CVG 18 to produce as its output voltage CV a d.c. voltage for supply to the drive circuit 10 as the voltage DV. The CVG 18 is supplied with power from the C.O. battery voltage (e.g. −56 volts) BV.

In an on-hook state of the telephone line, the digital control circuit 20 can disable the CVG 18 by not pulsing the control signals on the bus 42, so that the CVG produces a high impedance at its output, and can close the switch SW so that the battery voltage BV is supplied to the drive circuit 10 as the voltage DV. The relays TR and RR can have the same state as shown in FIG. 1.

For supplying a ringing signal to the ring wire of the telephone line, the digital control circuit 20 closes the switch SW to supply the drive circuit 10 from the battery voltage BV as described above, changes the state of the relay RR so that its contacts a and b are open and its contact c is closed (referred to as the set state of the relay), and controls the CVG to generate a ringing voltage waveform as its output voltage CV corresponding to a stored ringing reference waveform. The ringing voltage waveform is supplied to the ring terminal R via the closed contact b of the relay TR, the closed contact c of the relay RR, and the ring-wire resistor 26. A return path for the ringing signal is provided via the tip terminal T, the closed contact a of the relay TR, and the tip output of the drive circuit 10. A voltage arrester 44, connected between the output of the CVG and ground, serves to prevent an excessive voltage (e.g. greater than ±200 volts) from being supplied to the telephone line by presenting a low impedance to such excessive voltages. This causes an over-current in the CVG, which is indicated to the digital control circuit 20 by the signal OI in response to which the digital control circuit 20 disables the CVG 18 as is further described below.

These operating states are given here by way of example, and it should be appreciated that the line interface circuit is also operable in other states (e.g. ground start, tip-wire signalling, and coin signalling) as is further described in the parent and related patent applications.

It can be seen that there is a correlation between states of the switching circuit 14 and types of voltages generated by the CVG 18. Thus for example the CVG can be controlled to produce a d.c. voltage in a relatively low voltage range (less than the battery voltage BV) with the switching circuit 14 in the state shown in FIG. 1 with the relays TR and RR reset, or to produce an a.c. voltage waveform such as a ringing voltage waveform in a relatively high voltage range, this being supplied to the line via one of the terminals T and R with one of the relays TR and RR being in the set state (opposite to that shown in FIG. 1).

If this correlation is lost due to a fault in the operation of the line interface circuit, it is necessary to ensure that potentially hazardous conditions are not created on the telephone line, and it is desirable to ensure that potentially damaging conditions are not created within the line interface circuit. Such a fault could be either a software fault or a hardware fault such as a stuck relay, either of which could potentially result in a high d.c. voltage being generated by the CVG 18 and applied to the telephone line or to the drive circuit 10. The description below describes measures which are taken in the line interface circuit in accordance with this invention to prevent occurrence of such potentially hazardous or damaging conditions.

Figure 2:
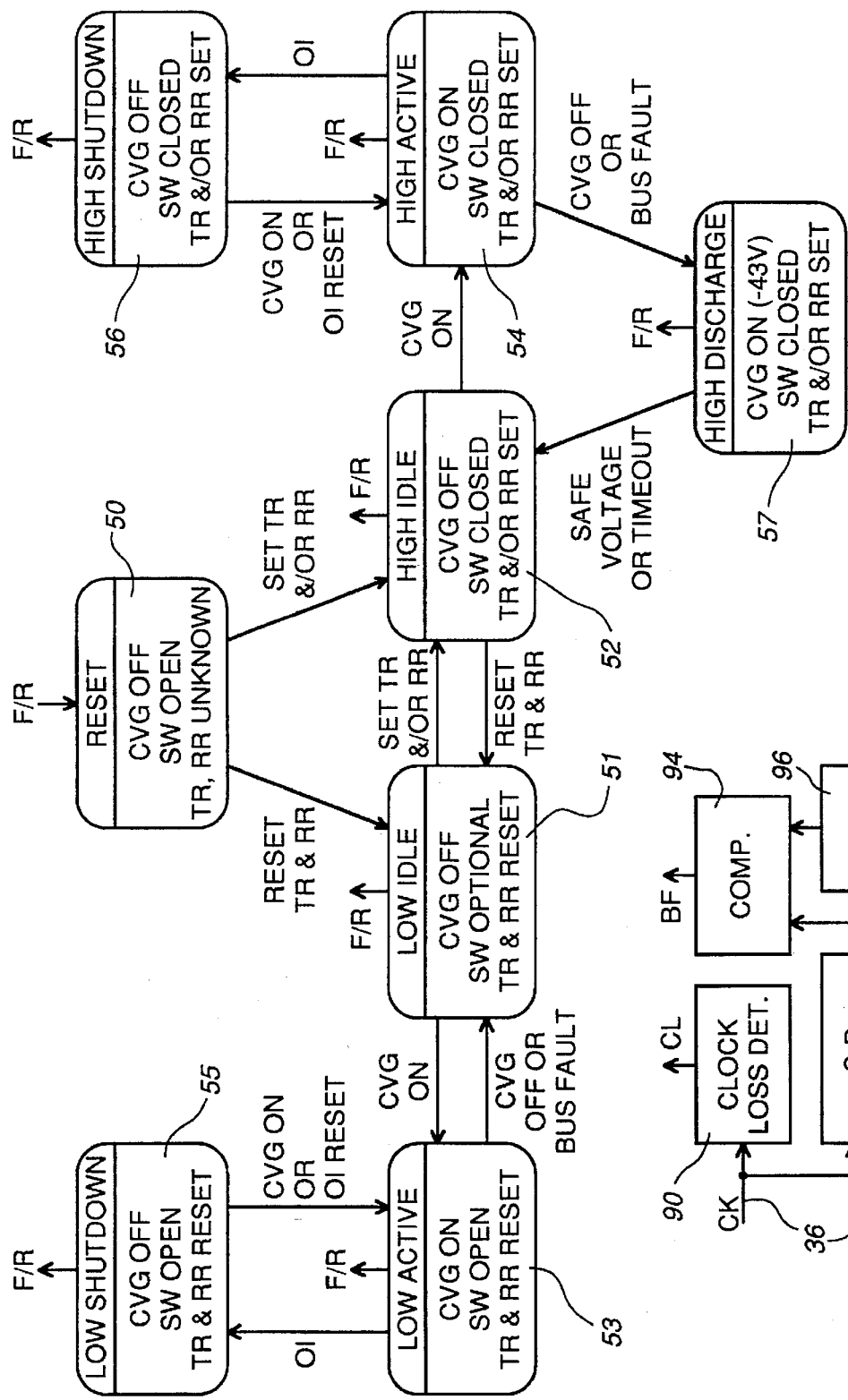
FIG. 2 shows a state diagram of a control circuit in the line interface circuit of FIG. 1.

FIG. 2 illustrates a state diagram relating to the operation of the digital control circuit 20. Each of the operating states 50 to 57 is represented by a rounded-corner rectangle including, above a horizontal line within the rectangle, a name of the state and, below the horizontal line, conditions of the CVG 18, switch SW, and relays TR and RR. Arrowed lines between the states 50 to 57 indicate transitions between the states, and labels adjacent these lines indicate conditions relating to these transitions.

In FIG. 2, F/R denotes a clock loss fault or reset command, which produces a transition from any of the states 51 to 57 to a Reset state 50. In the Reset state 50, the digital-control circuit 20 controls the CVG 18 to be off or disabled (i.e. it produces no pulsed signals on the bus 42) and opens the switch SW. The states of the relays TR and RR are deemed as being unknown, regardless of the contents of relay position registers which are included within the control circuit 20 and which are normally updated to reflect the states of the relays TR and RR.

From the Reset state 50, or from the state 52 described below, resetting of both of the relays TR and RR corresponds to a transition to a Low Idle state 51, in which both of the relays TR and RR are reset and the switch SW can either be open (i.e. the d.c. feed state shown in FIG. 1) or closed (so that the drive circuit 10 is supplied from the battery voltage BV). In this state 51 the CVG 18 is still off or disabled; its output is connected for supplying a low voltage to the drive circuit 10 but it presents a high impedance thereto.

From the Reset state 50, or from the Low Idle state 51, setting of one of the relays TR and RR with resetting of the other relay, or setting of both of the relays TR and RR, corresponds to a transition to a High Idle state 52. In this state 52 the switch SW is closed so that the drive circuit 10 is supplied from the battery voltage BV, the CVG 18 is still off or disabled, so that its output presents a high impedance, and at least one of the relays TR and RR is set so that the output of the CVG is connected to the tip or ring wire for supplying a high voltage waveform thereto.

A command to turn the CVG on produces a transition from the Low Idle state 51 (with the switch SW open) to a Low Active state 53, or from the High Idle state 52 to a High Active state 54, in which the CVG 18 is turned on or enabled by pulsed signals supplied via the bus 42. In the Low Active state 53, the switch SW is open and the CVG 18 generates a relatively low controlled d.c. voltage for supply to the drive circuit 10 as the voltage DV, and in the High Active state 54 the switch SW is closed to supply the drive circuit 10 from the battery voltage BV, and the CVG 18 generates a desired high voltage a.c. waveform (e.g. a ringing signal) in accordance with a reference waveform supplied to the digital control circuit 20. Thus the states 53 and 54 are normal operating states of the line interface circuit during a telephone call and ringing respectively.

In the event that the CVG 18 detects an over-current OI and communicates this to the digital control circuit 20 as described above with reference to FIG. 1, a Low Shutdown state 55 is reached from the Low Active state 53, and a High Shutdown state 56 is reached from the High Active state 54. In these states 55 and 56 the CVG 18 is turned off or disabled, and the state of the switching circuit 14 is unchanged. A return is made from the Low Shutdown state 55 to the Low Active state 53, and from the High Shutdown state 56 to the High Active state 54, in response to a command to turn the CVG on or in response to a resetting of the over-current indication in the digital control circuit 20. Repeated over-current conditions, causing the state 55 or 56 to be reached recurrently, result in a reset command producing a return to the Reset state 50.

From the Low Active state 53, a command to turn off the CVG 18, or detection of a fault on the bus 36 as described below, causes a return to the Low Idle state 51 in which the CVG is turned off or disabled. From the High Active state 54, a command to turn off the CVG 18, or detection of a fault on the bus 36 as described below, causes a High Discharge state 57 to be reached. In this state 57, the CVG is controlled to produce a safe voltage, for example −43 volts, as its output CV. This is a temporary state which is maintained until sensing of the error voltage VE indicates that a safe voltage value of the generated voltage CV has been reached, or a timeout period has expired. A transition is then automatically made to the High Idle state 54, in which the CVG 18 is turned off or disabled. The provision of the High Discharge state 57 ensures that the output voltage of the CVG is always brought to a safe value, and that an output capacitor of the CVG is discharged to this value from any higher voltage, before the CVG is actually disabled and any subsequent change in the state of the switching circuit 14 can take place, thereby preventing the possibility of a high voltage being present at the output of the CVG during switching of the circuit 14.

For convenience and symmetry of the low and high voltage operations of the line interface circuit, a Low Discharge state can if desired be similarly provided for transitions from the Low Active state 53 to the Low Idle state 51, but this is not required and is not illustrated in FIG. 2.

It can be seen that changes in the states of the relays TR and RR can only take place among the states 50, 51, and 52 when the CVG 18 is off or disabled. Conversely, the CVG 18 can only be turned on or enabled with determined states of the relays TR and RR, as in the states 51 and 55 for low voltage generation and the states 52 and 56 for high voltage operation. There is thus an interlock between the control of the switching circuit 14 and the CVG 18, in that changing states of the relays and active operation of the CVG are mutually exclusive.

Figure 3:
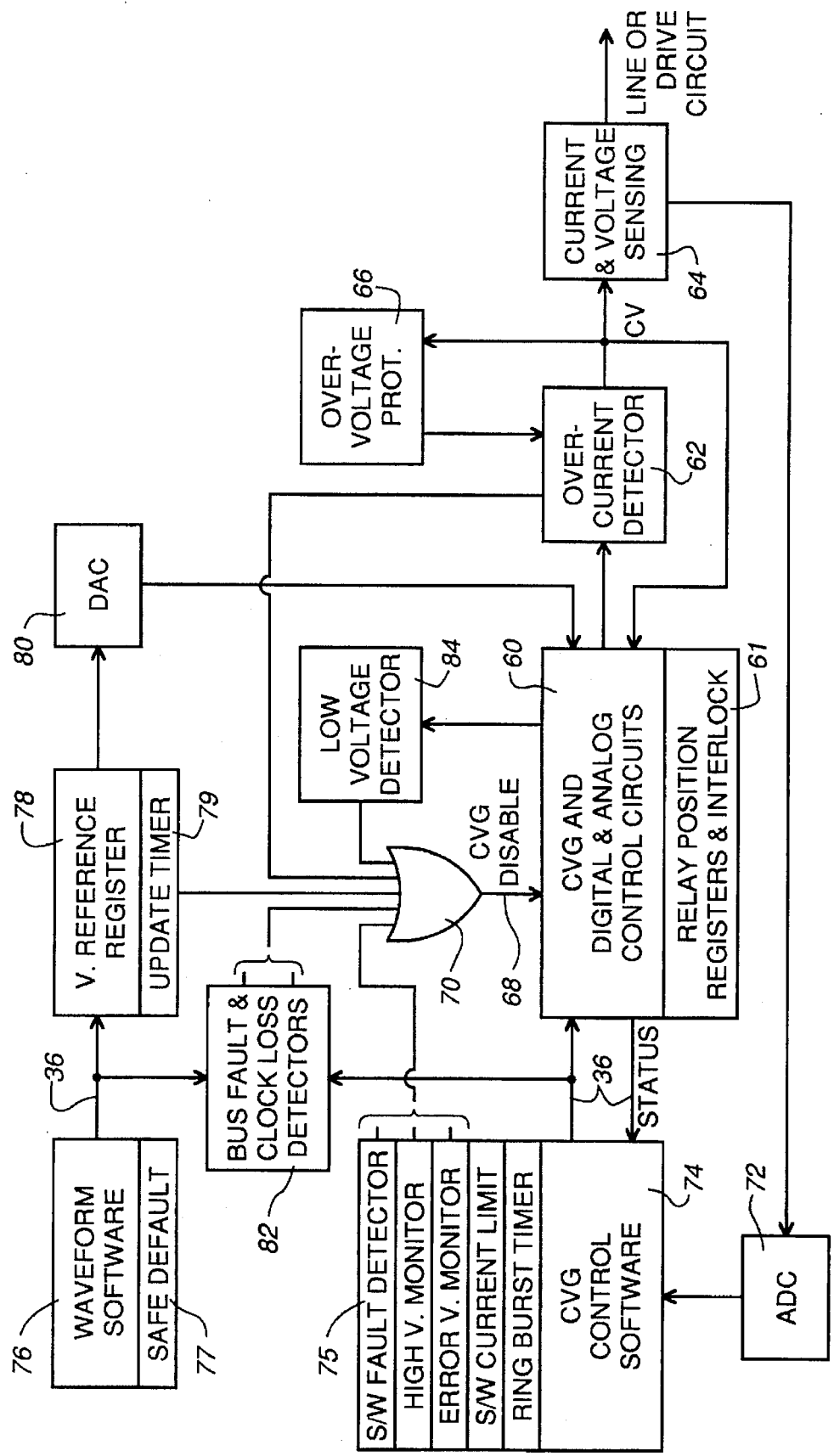
FIG. 3 is a functional diagram illustrating measures used in the line interface circuit to avoid creating hazardous conditions in accordance with the invention.

Referring to FIG. 3, a block 60 represents the CVG 18 and related analog and digital control circuits constituted largely by the digital control circuit 20 in FIG. 1, and an associated block 61 represents the relay position registers and interlock described above. An output of the block 60 is supplied via an over-current detector block 62, which represents the over-current detector within the CVG 18, as the controlled voltage CV. This voltage CV is fed back to the block 60 to be controlled thereby, and is supplied via a current and voltage sensing block 64, corresponding to the sensing circuit 12 in FIG. 1, either to the telephone line via the terminal T or R or to the drive circuit 10, depending on the state of the switching circuit 14 as described above. An over-voltage protection block 66 represents the voltage arrester 44 in FIG. 1. In the event of an over-voltage as described above, a break-over of this arrester results in an over-current which is detected in the block 62, which results in the CVG 18 being turned off by a path 68 including an OR function 70 represented by an OR gate.

Outputs of the sensing block 64 are supplied via an analog-to-digital converter (ADC) block 72, corresponding to the converter 22 in FIG. 1, to a CVG control software block 74, which represents software within the interface unit 24 in FIG. 1. The control software block 74 includes functions 75, identified as a software fault detector, high voltage monitor, error voltage monitor, software current limit, and ring burst timer, which are discussed further below. Outputs of some of these functions can also disable the CVG 18 via the OR function 70. The CVG control software block 74 communicates control information to, and receives status information from, the block 60 via paths constituted by the bus 36 in FIG. 1.

FIG. 3 also shows separately for convenience a waveform software block 76, with an associated safe default 77, constituted by parts of the interface unit 24 in FIG. 1 and also communicating via the bus 36 with a voltage reference register block 78, with an associated update timer 79, which for convenience are shown separately from the block 60 but are constituted by parts of the digital control circuit 20 in FIG. 1. For example, samples of a ringing reference waveform are supplied by the block 76 to the register 78, and these are converted by a digital-to-analog converter (DAC) block 80 into a signal which is supplied to the block 60 for controlling the CVG to produce a corresponding ringing voltage at its output as already described.

FIG. 3 further shows a block 82 representing detectors for detecting faults and loss of clock signals on the bus 36, and a detector 84 for detecting a low supply voltage for powering parts of the line interface circuit, whose outputs and an output of the update timer 79 are also supplied to the OR function 70 for disabling the CVG in the event of respective faults.

Figure 4:
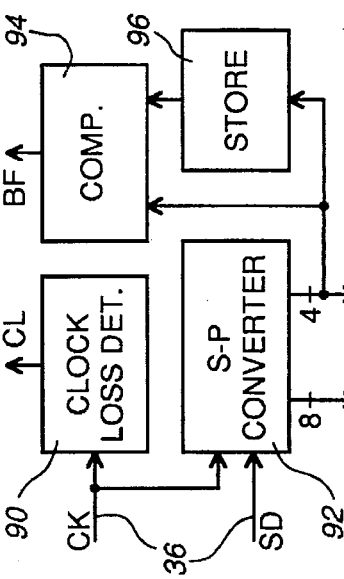
FIG. 4 shows a block diagram illustrating clock loss and bus fault detectors of the line interface circuit.

FIG. 4 shows a block diagram illustrating the clock loss and bus fault detectors of the block 82. The clock loss detector, which for example can be constituted by a retriggerable monostable circuit, is shown as a block 90 which is supplied with a clock signal CK from one line of the bus 36 and produces a clock loss signal CL in the event that the clock signal CK is not present. The bus 36 also comprises a second line for supplying serial data SD from the CVG control software 74 to the circuits 60 in FIG. 3, and a third line (not shown in FIG. 4) for returning the status information in serial form in the opposite direction from the circuits 60 to the software 74 as described above with reference to FIG. 2. The same clock signal CK serves for both directions of serial data transmission.

Each serial data transmission via the bus 36 consists of 14 serial bits including a start bit, 4 mode bits, and 8 data bits, with an arbitrary number of stop bits between successive data transmissions. The mode bits identify the purpose of the data bits, and the control software 74 is arranged so that successive data transmissions always (in normal operation)

have different sets of mode bits. By way of example, different sets of mode bits may represent a reset command, settings for different DACs (the mode bits identifying the DAC and the data bits representing the setting), relay control signals, and so on.

The serial data SD and the clock signal CK are supplied to a serial-to-parallel converter 92 in FIG. 4, which has outputs for supplying the mode and data bits of each data transmission to the circuits 60. The 4 mode bits are also supplied to a 4-bit comparator 94 both directly and via a store 96, which stores each set of mode bits until the occurrence of the next set. If the comparator detects equality of any two successive sets of mode bits supplied to its inputs, it produces a signal BF representing a bus fault.

Referring again to FIG. 3, if the clock loss detector in the block 82 produces the signal CL indicating a loss of the clock signal, it disables the CVG via the OR function 70. This results in a resetting of the control circuitry to the Reset state 50 in FIG. 2. A repeated set of mode bits on the bus 36 is interpreted as a bus fault by the bus fault detector in the block 82 as described above, producing the signal BF which disables the CVG via the OR function 70. This results in a transition from the Low Active state 53 to the Low Idle state 51, or from the High Active state 54 to the High Discharge state 57 and subsequently to the High Idle state 52.

The low voltage detector 84 likewise disables the CVG via the OR function 70 if a monitored power rail for the control circuitry falls below a voltage required for proper operation, as such a situation may cause a loss of control of the CVG and consequent risk of a hazardous condition. Furthermore, the CVG is disabled via the OR function 70 if the update timer 79 determines that a timeout period, for example 2 to 2.5 ms, has expired without the contents of the voltage reference register 78 being updated, this again being interpreted as a loss of control by the line interface circuit software.

Subject to the above, the CVG control software 74 can, via the bus 36, program (i.e. set and/or reset) the relays TR and RR and enable the CVG 18 in accordance with the state diagram of FIG. 2. As indicated in FIG. 3, the status of the CVG is fed back from the block 60 via the bus 36 so that the control software can monitor for problem conditions. The status information includes bits indicating whether the CVG is on (enabled) or off (disabled), whether or not it is in a Shutdown state 55 or 56 due to an over-current, whether or not a command received via the bus 36 has been rejected (for example, a relay command which is prohibited by the interlock), and whether or not the monitored supply voltage is sufficient.

As already described above, all commands to change the state of the relays TR and RR are prohibited when the CVG is on. Such commands are also prohibited in the Shutdown states 55 and 56, on the basis that an output voltage of the CVG which has resulted in an over-current as detected in the block 62, and which causes the CVG to be disabled via the OR function 70, may remain due to the output capacitor of the CVG and is uncontrolled and therefore should not be switched. Recovery from the Shutdown state 55 or 56 (other than by a reset command) is by turning the CVG on as shown in FIG. 2; the CVG output voltage is then properly controlled, and the recovery is successful if there is no subsequent over-current condition. Likewise, turn-off of the CVG via the Discharge state 57 ensures that the output voltage of the CVG remains properly controlled to safe values, prior to any relay switching, as already described above.

The safe default 77 in FIG. 3, which represents a CVG output voltage of −32 volts when the relays TR and RR are both reset and +7 volts otherwise, is used as the voltage reference for the CVG in the event that the software fails to update the CVG reference regularly. The default value is supplied to the input of the voltage reference register 78 but is not normally latched into this register, being overwritten by the next update voltage value for the CVG being supplied by the waveform software 76. In the event that a software fault results in such overwriting not taking place, the safe default value is latched into the register 78, thereby ensuring that the CVG output voltage remains at a safe level in the event of such a software fault. The update timer 79 operates as described above, serving as a further safety measure.

The software fault detector, which is one of the functions 75 in FIG. 3, produces a Reset command for the CVG control circuitry, thereby disabling the CVG as already described, in the event that the software fails to reset a watchdog timer for example every 4 ms, or in the event that an endless loop is detected by repeated crossings of the same software module boundary without complementary crossings of an opposite boundary.

The high voltage monitor function 75 is a software routine which monitors the common mode voltage at the terminals T and R, via the sensing circuit block 64 and ADC block 72, and, when the CVG is on, interprets a common mode voltage of more than ±75 volts which lasts for at least 2 seconds as a hazard, in response to which it produces a command to turn off the CVG. This monitor also serves for monitoring the common mode voltage on the telephone line for protection and recovery purposes as described in application Ser. No. 08/041,377, also turning the CVG off in the event of a protection switch to protect the line interface circuit from faults on the telephone line.

The error voltage monitor function 75 is a software routine which monitors the voltage VE, which as described above represents the difference between the desired CVG output voltage as determined by the control software and the actual voltage CV. Differences exceeding a threshold level for more than an allowed period are interpreted as a potential hazard condition and produce a command to turn off the CVG.

The software current limit function 75 is a software routine which monitors, via the sensing block 64 and the ADC 72, the currents flowing via the terminals T and R during a ringing waveform and attenuates the ringing waveform voltage if this produces a current via either terminal of more than about 90 mA peak, thereby reducing the severity of any possible hazard without interrupting the ringing signal. Similar measures to limit current and voltage are provided for coin signalling. The ring burst timer serves to ensure that there is at least 1 second of silence (e.g. the output voltage CV is held at −48 volts) during any 6 seconds of a ringing signal, thereby ensuring that no prolonged high voltage a.c. waveform is supplied to the telephone line.

It should be appreciated from the description above that the line interface circuit includes a number of inter-related measures which collectively substantially eliminate the potential for hazardous conditions being created on the telephone line through faulty operation of the line interface circuit, whether the fault arises in the hardware or the software, and also reduce the risk of damage to the line interface circuit itself in the event of a fault. To a large extent, these measures make use of hardware functions in the line interface circuit, such as the current and voltage sensing circuit 12, the A-D converter 22, and the over-current detector in the CVG 18, which are in any event provided in the line interface circuit, together with appropriate software routines, whereby these measures can be implemented with negligible additional cost. At the same time, any unusual behaviour of the line interface circuit as determined by the hardware and software routines is interpreted as a possible hazard, resulting in protective action such as turning off the CVG, so that any error is on the side of safety.

Considered in a general manner, the line interface circuit is configured as described above in such a manner that the software serves to check both the software (e.g. through the software fault detector and ring burst timer) and the hardware (e.g. through the high voltage and error voltage monitors and the software current limit), and the hardware serves to check the hardware (e.g. through the low voltage detector) and operation of the software (e.g. through the over-current detector and over-voltage arrester), in each case with consequent actions when necessary to reduce the possibility of any hazardous condition being created on the telephone line.

Although as described above all relay switching commands are prohibited at any time when the CVG is on or enabled, this need not necessarily be the case for hazard prevention alone. As an alternative, only those relay commands need be prohibited which would otherwise cause at least one of the relays TR and RR to be set, and hence which would otherwise cause the switching circuit 14 to couple the output of the CVG 18 to the telephone line terminal T or R. Commands to reset both relays while the CVG 18 is active could be permitted, because this in itself would not create a hazardous condition on the telephone line. However, this alternative may not be preferred because it could result in damage to the line interface circuit being caused in the event of a fault by application of a high voltage from the CVG 18 to the drive circuit 10.

In addition, although a particular operating state diagram has been illustrated and described above, numerous changes can be made to this. For example, a transition may additionally be provided from the Shutdown state 55 or 56 to the Idle state 51 or 52 respectively in response, for example, to a command to turn the CVG off, thereby providing an alternative exit from the Shutdown state in an over-current situation without requiring a Reset command, and permitting the states of the relays TR and RR to be changed.

Furthermore, although the bus fault detector has been described in relation to a particular form of data on the bus 36, specifically one in which mode bits of successive data transmissions are always different for the multiple control signals carried by this bus, this need not be the case. For example, dummy data transmissions could be inserted between successive data transmissions which would otherwise have the same mode bits, and it is only necessary for one bit which changes between successive data transmissions (actual or dummy) to be monitored for detection of bus faults. Although not discussed above, the serial data line carrying status information in the opposite direction can be monitored in a similar manner, and parallel data paths can be provided instead of serial data lines.

Thus although a particular embodiment of the invention has been described in detail, it should be appreciated that these and numerous other modifications, variations, and adaptations may be made without departing from the scope of the invention as defined in the claims.

What is claimed is:

1. A method of operating a telephone line interface circuit which includes a controlled voltage generator, a drive circuit, and a switching circuit, the line interface circuit having a first operating state in which the controlled voltage generator generates a relatively low voltage which is coupled by the switching circuit to the drive circuit, and a second operating state in which the controlled voltage generator generates a high voltage waveform which is coupled by the switching circuit from an output of the controlled voltage generator to a telephone line, the method comprising switching from the first operating state to the second operating state by the steps of sequentially:

disabling the controlled voltage generator;

changing the state of the switching circuit; and enabling the controlled voltage generator to generate the high voltage waveform.

2. A method as claimed in claim 1, further comprising switching from the second operating state to the first operating state by the steps of sequentially:

disabling the controlled voltage generator;

changing the state of the switching circuit; and enabling the controlled voltage generator to generate the relatively low voltage.

3. A method as claimed in claim 2 wherein the step of disabling the controlled voltage generator from generating the high voltage waveform comprises initially controlling the controlled voltage generator to generate a relatively low voltage at its output.

4. A method as claimed in claim 1 and further comprising the steps of:

detecting a potential failure to continue generation of the high voltage waveform by the controlled voltage generator in the second operating state; and disabling the controlled voltage generator in response to detection of such a potential failure.

5. A method as claimed in claim 4 wherein the step of detecting a potential failure to continue generation of the high voltage waveform by the controlled voltage generator in the second operating state comprises the step of monitoring a clock signal supplied to the controlled voltage generator.

6. A method as claimed in claim 4 wherein the step of detecting a potential failure to continue generation of the high voltage waveform by the controlled voltage generator in the second operating state comprises the step of monitoring updating of a waveform reference voltage supplied to the controlled voltage generator.

7. A method of operating a telephone line interface circuit which includes a controlled voltage generator, a drive circuit, and a switching circuit, the line interface circuit having a first operating state in which the controlled voltage generator generates a relatively low voltage which is coupled by the switching circuit to the drive circuit, and a second operating state in which the controlled voltage generator generates a high voltage waveform which is coupled by the switching circuit from an output of the controlled voltage generator to a telephone line, the method comprising switching from the second operating state to the first operating state by the steps of sequentially:

disabling the controlled voltage generator;

changing the state of the switching circuit; and enabling the controlled voltage generator to generate the relatively low voltage.

8. A method as claimed in claim 7 wherein the step of disabling the controlled voltage generator from generating the high voltage waveform comprises initially controlling the controlled voltage generator to generate a relatively low voltage at its output.

* * * * *